United States Patent [19]
Barba

[11] Patent Number: 5,914,576
[45] Date of Patent: Jun. 22, 1999

[54] LOCKING DEVICES AND CONTROL CIRCUITRY FOR PERMANENT MAGNET ELECTRIC MOTORS

[75] Inventor: Valentin Barba, Scotrun, Pa.

[73] Assignee: GEC-Marconi Aerospace Inc., Whippany, N.J.

[21] Appl. No.: 09/136,031

[22] Filed: Aug. 19, 1998

Related U.S. Application Data

[62] Division of application No. 08/556,576, Nov. 13, 1995.

[51] Int. Cl.$^6$ ...................................................... H02P 1/00
[52] U.S. Cl. ............................ 318/282; 318/286; 318/291; 310/127
[58] Field of Search ..................................... 318/282, 286, 318/292, 468, 375, 291, 541, 542; 310/238, 239, 241, 127, 148

[56] References Cited

U.S. PATENT DOCUMENTS

| | | | |
|---|---|---|---|
| 4,367,887 | 1/1983 | Takada ..................... | 280/803 |
| 4,545,004 | 10/1985 | Kade et al. ............... | 363/63 |
| 4,556,831 | 12/1985 | Sakamoto et al. ........ | 318/434 |
| 4,609,853 | 9/1986 | Mattern ..................... | 318/363 |
| 4,616,305 | 10/1986 | Damiano et al. .......... | 363/132 |
| 5,023,532 | 6/1991 | Gakenholz ................. | 318/541 |
| 5,184,050 | 2/1993 | Harada et al. ............. | 318/467 |
| 5,334,919 | 8/1994 | Willard ..................... | 318/375 |
| 5,502,367 | 3/1996 | Jones ......................... | 318/281 |
| 5,789,885 | 8/1998 | Seel ........................... | 318/375 |
| 5,818,184 | 10/1998 | Kim ........................... | 318/375 |

*Primary Examiner*—Brian Sircus
*Attorney, Agent, or Firm*—Fish & Neave; Robert R. Jackson; Walter M. Egbert, III

[57] ABSTRACT

A positive locking device is provided in order to prevent a motor from rotating after power has been removed. The positive locking device has a plate mounted on the motor which engages a disk or hub on the shaft of the motor. In another aspect of the invention, solid state circuitry for switching a permanent magnet motor and providing dynamic braking thereto is provided. The circuitry allows the back EMF generated by the armature coils of a permanent magnet motor to cause a current to flow through the motor when power is removed. This back EMF may be used to help produce smooth engagement of the locking device. In another aspect of the invention, a dynamic braking circuit for a dual armature permanent magnet motor is provided. By applying current to one or the other of two oppositely wound armature coils the motor is made to rotate in either direction. When power is removed from the active armature, this armature is short-circuited through a diode. The same diode is used to dynamically brake the motor when power is removed from the other armature. In both cases the spinning rotor will quickly slow down to facilitate smooth engagement of the positive locking device.

25 Claims, 7 Drawing Sheets

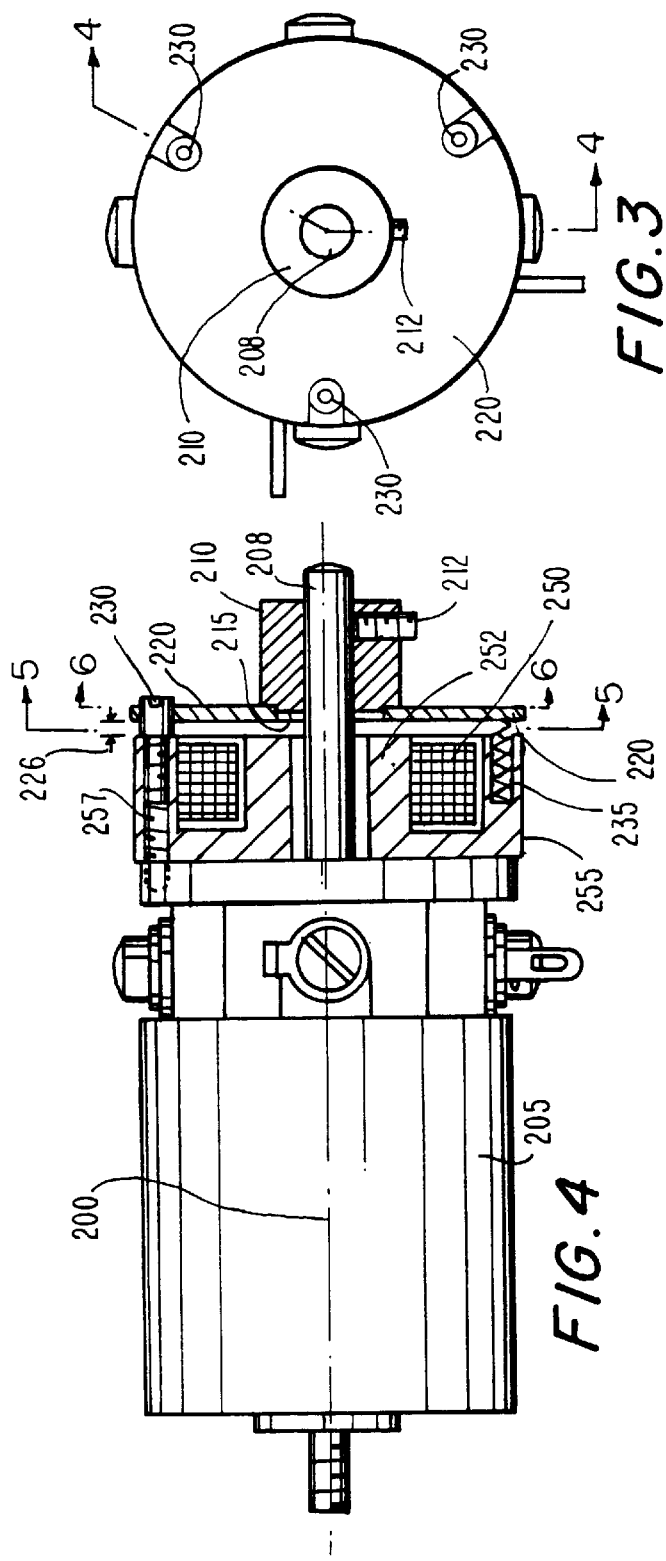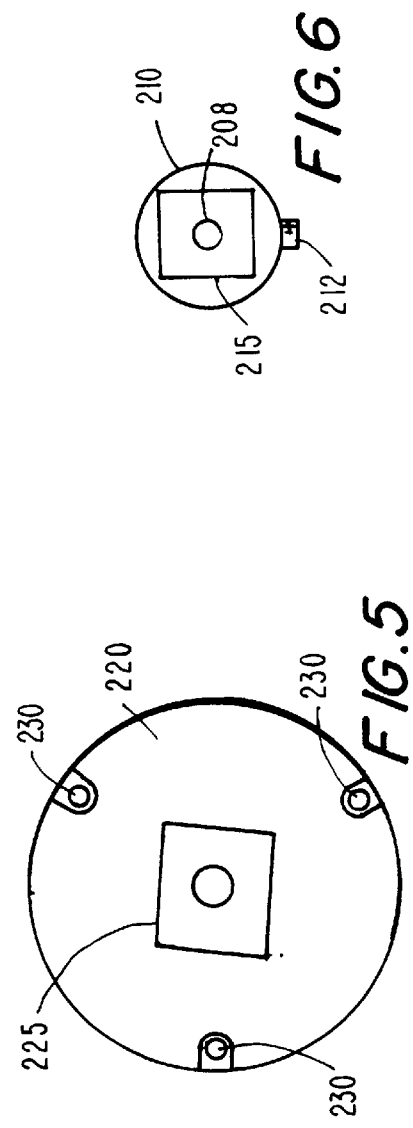

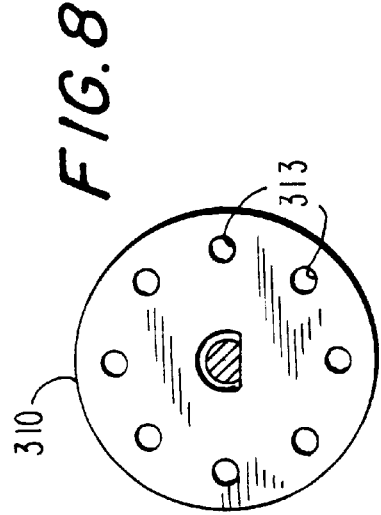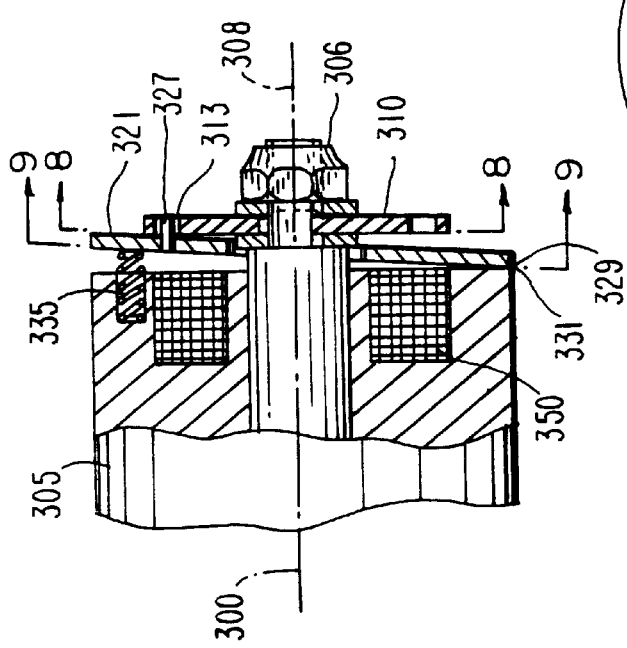

LOCKING DEVICES AND CONTROL CIRCUITRY FOR PERMANENT MAGNET ELECTRIC MOTORS

This is a division, of application Ser. No. 08/556,576, filed Nov. 13, 1995.

BACKGROUND OF THE INVENTION

This invention relates to positive locking devices for use with electrical motors, especially permanent magnet direct current motors used with aircraft accessories. Another aspect of the invention relates to circuitry for switching a permanent magnet motor and providing dynamic braking thereto. In particular, the invention relates to three-input, solid-state, switching circuitry for switching a permanent magnet motor and providing dynamic braking thereto. A third aspect of the invention relates to circuitry for providing dynamic braking for a permanent magnet motor having dual armatures. "Split series" direct current ("DC") motors have commonly been used in order to power aircraft accessories. Split series DC motors have two stator coils which are wound in opposite directions. The two coils allow the direction of rotation of the motor to be chosen simply by energizing one or the other of the oppositely wound coils.

A simple three-wire connection has commonly been used to select the direction of rotation of a split series motor. Such a three-wire connection comprises a power return connection which is coupled to the return lead of each coil, a power input connection for the first coil, and a power input connection for the second coil. The direction of rotation of the motor is chosen by applying power to the power input of either the first or the second coil. Split series motors previously have been popular because this simple three-wire connection can be used to control the motor.

Split series motors, however, suffer from certain disadvantages. One disadvantage is that employing two coils leads to relatively larger, heavier, and more costly motors as compared to permanent magnet ("PM") DC motors. Another disadvantage is that split series motors, in contrast to PM motors, cannot be dynamically braked.

As the name suggests, PM motors use permanent magnets, rather than wound coils, to provide a magnetic field in which the armature rotates. In order to reverse the direction of rotation of a PM motor, the polarity of the electrical connections to the armature brushes must be reversed.

In order to control a PM motor using a three-wire connection which is analogous to the split series switching arrangement, solid-state switching circuitry having MOS-FETs has been used. This switching circuitry allows a user to use a three-wire connection in which one connection is used for the power return, and power is applied to one of the other two connections in order to select the direction of rotation. Such solid-state switching circuitry provides the advantage that it is transparent to a user accustomed to using a split series motor.

However, the solid-state switching circuitry for PM motors described in the preceding paragraph does not take advantage of the fact that PM motors can be dynamically braked. When a motor is turned off, the armature of the motor usually continues to spin due to its rotational inertia. The spinning armature of a PM motor generates a back electromotive force ("EMF"). Dynamic braking is provided by switching the armature into a short circuit, or a load resistor, when the motor is turned off, thereby causing the back EMF to generate a current. The energy dissipated by the current causes the spinning armature to quickly slow down.

In order to provide a simple three-input control of a PM motor and quickly slow down the motor after power has been removed, it would be advantageous to provide a three-input, solid-state switching circuit for controlling a PM motor which also provides dynamic braking to the motor.

After an electric motor has come to rest, various forces may cause the motor to rotate. Frictional brakes have been used in order to hold a motor in a fixed position after it has been shut off. However, frictional brakes have the disadvantage that the braking force is proportional to the spring force used to apply the braking, and that undue wear may occur on components of the motor due to frictional forces.

In view of the shortcomings of frictional brakes, it would be advantageous to provide a positive locking device to prevent rotation of the armature of an electric motor while the motor is not energized. In a positive locking device the motor is mechanically held fixed, rather than frictionally held fixed.

SUMMARY OF THE INVENTION

In view of the foregoing it is an object of the present invention to provide a three-input, solid-state switching circuit for controlling and providing dynamic braking to a PM motor. In accordance with this and other objects of the present invention, a solid state circuit is provided so that when power is removed from the PM motor, the armature brushes of the motor are electrically coupled so as to allow a current to flow through the motor. The flowing current provides dynamic braking to the motor.

It is another object of the present invention to provide a positive locking device for use with an electric motor. In accordance with this and other objects of the present invention, a positive locking device having a plate which is fixedly mounted on the motor with respect to rotation about the shaft of the motor, and movably mounted on the motor with respect to motion substantially parallel to the shaft axis, is provided. The locking device also has a disk/hub which is fixedly mounted on the shaft and located proximate the plate. The disk/hub and the plate are adapted to engage one another so as to prevent the shaft from rotating. A coil is fixedly attached to the motor and is located proximate the plate so that the plate is positioned between the coil and the disk/hub. At least one spring is provided for urging the plate away from the coil and toward the disk/hub. The positive locking device operates as follows. When electrical power is applied to the motor, the coil produces a magnetic field which urges the plate toward the coil and away from the disk/hub so as to allow the disk/hub, to rotate freely. However, when electrical power is removed from the motor, the spring urges the plate toward the disk/hub so as to allow the plate to engage the disk/hub when the motor has slowed down, thereby providing positive locking of the motor without attempting to abruptly stop it at high speed.

In a preferred embodiment the plate has a non-circular hole and the disk/hub has a protruding portion which is adapted to fit into the hole.

In another preferred embodiment the plate is movably mounted on the motor by a hinge. The hinge defines a hinge axis which preferably is perpendicular to the axis of the shaft of the motor. The hinge axis preferably is displaced from the shaft axis by a predetermined amount. The plate preferably has a pin and the disk preferably has a plurality of holes adapted to engage the pin. The pin preferably is located at the end of the plate opposite the hinge, so that rotation of the plate about the hinge causes the pin to move substantially parallel to the shaft of the motor. When power is removed from the motor, the pin is urged toward the holes so that when the motor slows down sufficiently, the pin enters one of the holes so as to engage the plate and disk and provide positive locking of the motor, again without abruptly stopping the motor from a high speed.

The positive locking device is preferably used with PM DC motors used to power aircraft accessories such as actuators.

It is yet another object of the present invention to provide a simple means to dynamically brake a PM motor having dual armatures. In accordance with this and other objects of the present invention, two oppositely wound armature coils are mounted on the shaft of a PM motor. By energizing one or the other of the armature coils, the motor is able to rotate in either direction. When an electrical current is provided to the first armature coil, the shaft of the motor rotates in a first direction with a first speed of rotation. Preferably when the same amount of electric current is provided to the second armature coil, the shaft rotates in the opposite direction with a speed of rotation which is substantially equal to the first speed of rotation.

Further features and advantages of the invention will be more apparent from the accompanying drawings (in which like reference characters represent like elements throughout) and the following detailed description of the preferred embodiments.

BRIEF DESCRIPTION OF THE DRAWINGS

FIG. 3 is an elevational view of a motor having a positive locking device constructed in accordance with a first preferred embodiment of the present invention.

FIG. 4 is a simplified, partial-cross sectional view taken along line 4—4 in FIG. 3.

FIG. 5 is a view taken along line 5—5 in FIG. 4.

FIG. 6 is a view taken along line 6—6 in FIG. 4 showing only a portion of the FIG. 4 apparatus.

FIG. 7 is a simplified cross sectional view of a motor having a positive locking device constructed in accordance with a second preferred embodiment of the present invention.

FIG. 8 is a view taken along line 8—8 in FIG. 7 of a portion of the apparatus shown in FIG. 7.

FIG. 9 is a view taken along line 9—9 in FIG. 7 of another portion of the apparatus shown in FIG. 7.

DETAILED DESCRIPTION OF THE PREFERRED EMBODIMENTS

Figure 1:
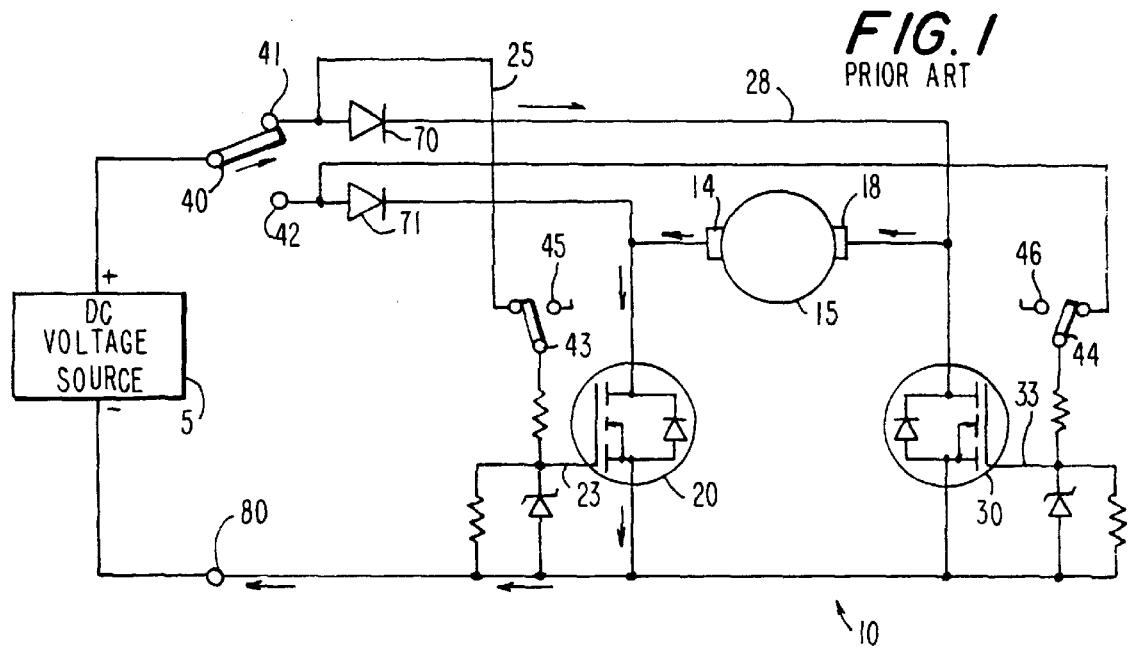
FIG. 1 is a schematic diagram of a previously known circuit for switching a PM motor.

A previously known circuit for switching a PM DC motor is shown in FIG. 1. Circuit 10 comprises first MOSFET transistor 20, second MOSFET transistor 30, motor 15, and switches 40, 43, 44. When switch 40 is in position 41 as shown in FIG. 1, a positive voltage from DC voltage source 5 is applied to gate 23 of MOSFET 20 through lead 25. This turns on MOSFET 20 and allows current to flow through motor 15. As indicated by the arrows, current flows sequentially through diode 70, armature brushes 18 and 14 of motor 15, MOSFET 20, and power return 80.

In order to shut off the motor, switch 43 (typically a limit switch, i.e., a switch which operates automatically when a component moved by the motor reaches a predetermined position) is moved to position 45, which disconnects gate 23 from the voltage source. This turns off MOSFET 20, thereby preventing current from flowing through motor 15 via MOSFET 20. With the power thus removed, motor 15 coasts to a stop.

The portion of the circuit containing MOSFET 30 operates in a similar manner. When switch 40 is moved to position 42, MOSFET 30 is turned on and current flows through motor 15 in the direction opposite the current shown in FIG. 1. In this case, current flows sequentially through diode 71, armature brushes 14 and 18 of motor 15, MOSFET 30, and power return 80.

In order to shut off the motor when it is rotating in the reverse direction, switch 44 (typically another limit switch) is moved to position 46, which disconnects gate 33 from the voltage source. This turns off MOSFET 30, thereby preventing current from flowing through motor 15 via MOSFET 30. With the power thus removed, motor 15 coasts to a stop.

Thus, by moving switch 40 between positions 41 and 42, a user is able to cause motor 15 to rotate in either direction. Once a voltage has been applied to position 41 or 42 of switch 40, the motor is shut off using switches 43 and 44. Circuit 10 thus provides a three-wire connection (i.e., 41, 42 and 80) which is transparent to a user accustomed to switching a split series motor via the same kind of three-wire connection.

However, circuit 10 suffers the disadvantage of not providing dynamic braking to the motor. Once the motor is shut off, it simply coasts to a stop without any dynamic braking.

In accordance with the present invention, a preferred embodiment of a circuit for controlling a PM motor and providing dynamic braking thereto is shown in FIGS. 2A–2D. Circuitry 100 comprises first transistor 150, second transistor 160, PM motor 170, switches 110, 120, 130, diodes 140, 145 and resistors 180, 185. Transistors 150, 160 preferably are MOSFETS, although other types of transistors can be used in accordance with the present invention. For example, bipolar transistors (either NPN or PNP) or insulated gate bipolar transistors could be used. These devices may require external diodes across the collector to emitter junctions to protect the devices from reverse voltage spikes and to provide paths for braking current. MOSFETs usually have the diodes built in.

Figure 2A:
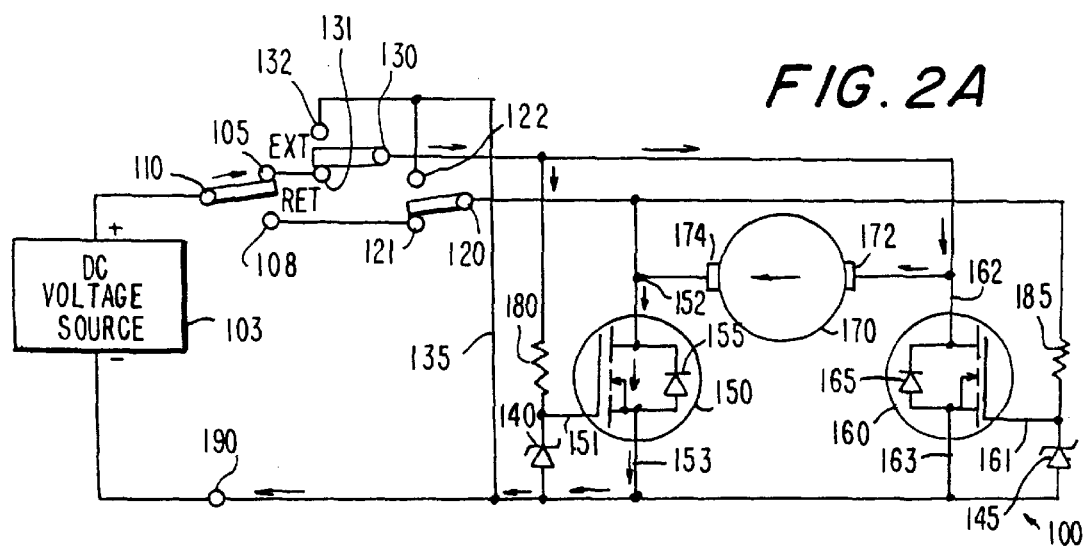
FIGS. 2A–2D are schematic diagrams of a circuit for switching a PM motor and providing dynamic braking thereto in accordance with the present invention.

In FIG. 2A circuitry 100 is shown providing power to motor 170 (for illustrative purposes the direction of rotation of the motor in FIG. 2A will be referred to as the "forward" direction). A voltage from DC power supply 103 is applied to input 105 via switch 110. As indicated by the arrows, current flows through resistor 180, Zener diode 140, and power return 190. This provides a positive voltage to gate 151 which turns on transistor 150. This allows current to flow through armature brushes 172 and 174 of motor 170 via drain 152 and source 153 of transistor 150 and then back to the voltage source through power return 190. The flow of current causes the motor to rotate in the forward direction.

Figure 2B:
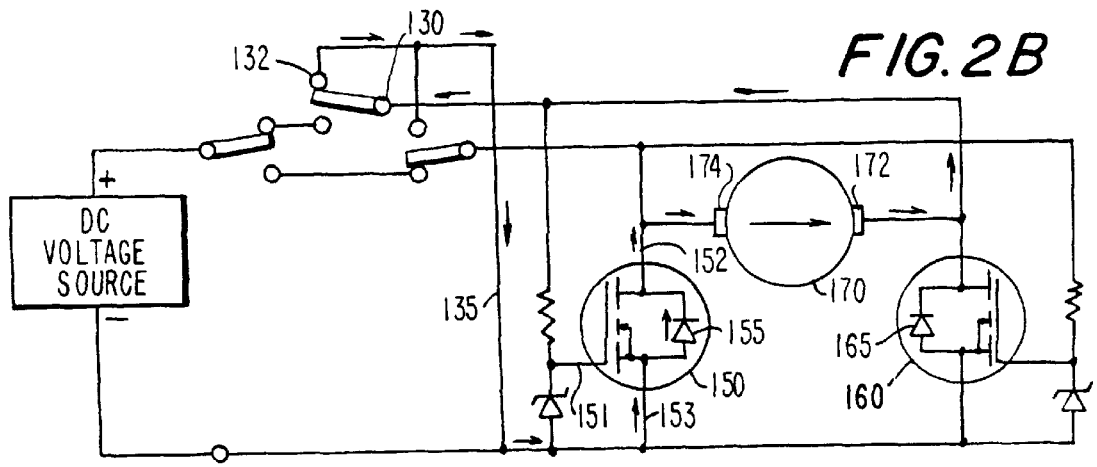

Referring now to FIG. 2B, in order to turn off the motor while it is rotating in the forward direction, switch 130 (typically a limit switch) is moved to position 132. This disconnects the power supply from switch 130, causing transistor 150 to be turned off and power to be removed from the motor. However, due to its rotational inertia, motor 170 continues to spin. The spinning motor generates a back EMF.

In accordance with the present invention, circuitry 100 is arranged so that the back EMF causes a current to flow through the motor. When switch 130 is in position 132, the current generated by the back EMF passes through armature brush 172, switch 130, lead 135, diode 155 of transistor 150, armature brush 174 and then back through motor 170. This current is indicated by the arrows in FIG. 2B.

Since a voltage is no longer applied to gate 151, transistor 150 is turned off. However, current passes from source 153 to drain 152 via diode 155. As shown in FIGS. 2A–2D, transistor 150 is a MOSFET having an internal diode. However, those skilled in the art will appreciate that other types of transistors can be used, and that a separate external diode may be used along with transistor 150.

Thus, when switch 130 is moved to position 132, the back EMF generated by motor 170 causes current to flow. The energy dissipated by resistive heating due to the flow of current causes the motor to quickly slow down. The present invention thus provides dynamic braking to PM motor 170.

The amount of resistive heating produced by the back EMF, and hence the amount of dynamic braking, can be adjusted, for example, by providing a load resistor in series with lead 135.

Figure 2C:
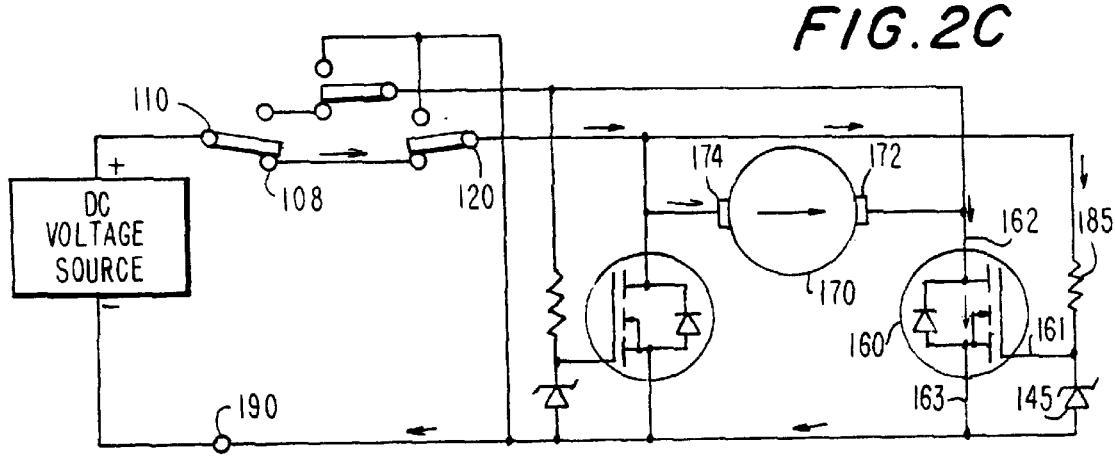

In FIG. 2C circuitry 100 is shown applying power to motor 170 for rotation in the reverse direction (as opposed to the forward direction as shown in FIG. 2A). The operation of circuitry 100 while the motor is rotating in the reverse direction is similar to that of circuitry 100 while the motor is rotating in the forward direction.

A voltage from voltage source 103 is applied to input 108 via switch 110. Current passes through resistor 185 and diode 145 and provides a voltage to gate 161 which turns on transistor 160. While transistor 160 is turned on, current passes through switch 120, armature brushes 174 and 172 of motor 170, transistor 160 via drain 162 and source 163, and then power return 190. The current passing through motor 170 causes it to rotate in the reverse direction.

Figure 2D:
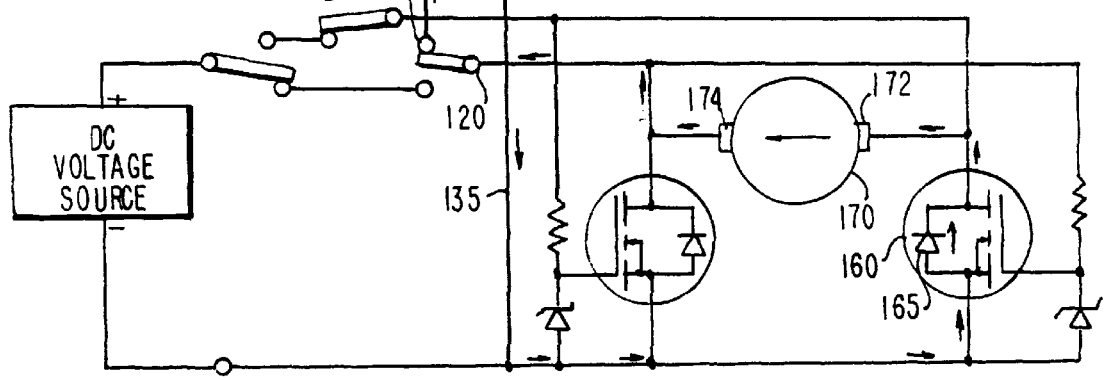

In order to turn off the motor while it is rotating in the reverse direction, switch 120 (typically another limit switch) is moved from position 121 to position 122 as shown in FIG. 2D. In a manner similar to FIG. 2B, this allows the back EMF generated by the motor to cause a current to flow.

As can be seen in FIG. 2D, the current generated by the back EMF flows through armature brush 174, switch 120, lead 135, diode 165 of transistor 160, armature brush 172, and then back through motor 170. As described above, this provides dynamic braking to motor 170 due to resistive heating caused by the flow of current.

Once again, a load resistor may be provided in series with lead 135 to adjust the amount of dynamic braking.

Circuit 100 is thus an improvement over previous switching circuits for PM motors since it provides dynamic braking in addition to using a simple three-wire connection, (i.e., 105, 108, and 190) which is transparent to users accustomed to split series motors. The dynamic braking is provided without major additional circuit components or complexity as compared to the prior art circuit of FIG. 1.

In accordance with a second aspect of the present invention, a first preferred embodiment of a positive locking device is shown in FIGS. 3–6.

Motor 205 is a conventional electric motor which causes shaft 208 to rotate when power is applied to the motor. By way of example only, motor 205 may be a PM DC motor used as an actuator to power an aircraft accessory.

Plate 220 is slidably attached to coil housing 255 by guide screws 230. The guide screws are fixedly attached to plate 220 and continually engage slots 257 in coil housing 255 so as to allow plate 220 to move along axis 200. Plate 220 is thus movably mounted to motor with respect to motions substantially parallel to axis 200, while being fixedly mounted to the motor with respect to rotations about axis 200.

Plate 220 is lightly urged toward disk/hub 210 by weak springs 235. (Disk/hub 210 is fixedly attached to shaft 208 of motor 205 by set screw 212.) In the embodiment shown in FIGS. 3–6, a pair of weak springs 235 are positioned opposite one another with respect to shaft 208. It will be clear to those skilled in the art that other numbers and arrangements of springs can be used in accordance with the present invention.

In order to provide positive locking to the motor, disk/hub 210 and plate 220 are adapted to engage one another. When disk/hub 210 and plate 220 are engaged, disk/hub 210 and hence shaft 208 are held in place and unable to rotate about axis 200. In the embodiment shown in FIGS. 3–6, plate 220 is provided with a central, square hole 225, while disk/hub 210 is provided with a central, square protruding portion 215 which fits into hole 225 with only a relatively small clearance. Springs 235 push hole 225 over protruding portion 215 of disk/hub 210 when the hole and protruding portion are aligned. When the disk/hub and plate are thus engaged, the shaft of motor 205 is unable to rotate and the motor is therefore positively locked. It can be seen in FIG. 4 that when the plate and disk/hub are engaged, a gap 226 exists between housing 255 and plate 220.

When motor 205 is energized, power is applied to coil 250 which is mounted to the motor in housing 255. The magnetic field created by coil 250 pulls plate 220 toward the coil and disengages plate 220 from disk/hub 210. The force on armature plate 220 provided by coil 250 is large enough to overcome the force produced by springs 235. When plate 220 is disengaged from disk/hub 210, disk/hub 210 is free to rotate. In this manner, the positive locking device does not interfere with the rotation of shaft 208 while power is applies to the motor.

When motor 205 is turned off, the disk/hub continues to spin due to its rotational inertia. When the motor is turned off power is also no longer applied to coil 250 from the external power supply (although depending on the circuitry (see, for example, FIGS. 10 and 11) dynamic braking current proportional to the speed of the motor may be applied to coil 250). As soon as the current through coil 250 is low enough, plate 220 is lightly urged toward disk/hub 210 by weak springs 235 as described above. While the disk/hub is spinning rapidly, protruding portion 215 of the disk/hub skips over hole 225 and does not engage it. In the brief amount of time protruding portion 215 is in register with hole 225, the disk/hub and plate are not able to become engaged. It is believed that because key 215 is only aligned with hole 225 for very small fractions of each rotation and springs 235 are weak, plate 220 is not provided with enough axial acceleration to engage key 215 of disk/hub 210 while it is spinning. (Also, in the case of circuit arrangements like those shown in FIGS. 10 and 11, the dynamic braking current through coil 250—until the motor has slowed down considerably—tends to hold back plate 220 and keep the locking mechanism from engaging.)

When key 215 has nearly stopped rotating, protruding portion 215 and hole 225 are able to become engaged. If disk/hub 210 is rotating very slowly and hole 225 becomes aligned with protruding portion 215, springs 235 push plate 220 toward disk/hub 210, causing protruding portion 215 to engage hole 225.

It may, however, happen that when disk/hub 210 has stopped rotating, protruding portion 215 is not in register with hole 225. In this case, if load forces or vibrations cause the shaft to begin to creep, protruding portion 215 will engage hole 225 at the first occurrence of registration, and thus lock the shaft.

An advantage of the positive locking device described above is that the locking force is not proportional to the spring force, as is the case in frictional brakes. Since the locking force is provided by the engagement of disk/hub 210 and plate 220, and not by friction produced by a spring force, a light spring can be used. This, in turn, allows a non-destructive coasting process (i.e., protruding portion 215 does not cause undue wear on plate 220 since the plate is lightly urged toward the disk/hub).

In general, the shape of protruding portion 215 and hole 225 can be any non-circular shape. A non-circular shape is defined as a shape in which the distance from axis 200 to a point on the perimeter of the shape varies as one traces the perimeter about axis 200. (In contrast, a circle has a constant radius as one traces its perimeter.) In accordance with the present invention, the protruding portion and hole can, for example, be oval, triangular, rectangular, star-shaped, diamond-shaped, or even irregularly-shaped. The parts carrying the protruding portion and hole can also be reversed if desired.

In accordance with the present invention, configurations other than the single-hole arrangement of plate 220 and disk/hub 210 described above can be used. For example, plate 220 can be provided with a series of holes along a circumference of the plate, and the disk/hub can be provided with one or more pins which fit into one or more of-the holes. The inverse can also be used. The plate can be provided with one or more protruding pins which fit into one or more holes in the disk/hub. It will be clear to those skilled in the art that numerous such configurations are possible.

A second preferred embodiment of a positive locking device constructed in accordance with the present invention is shown in FIGS. 7–9.

Disk/hub 310 is fixedly attached to shaft 308 by nut 306. Disk/hub 310 has at least one hole 313 which is configured to receive pin 327 of plate 321 with only a relatively small clearance. In the embodiment shown in FIGS. 7–9 eight holes are provided in the disk/hub, each hole being positioned approximately 45 degrees from the adjacent holes. It will be clear to those skilled in the art that other numbers of holes can be provided in accordance with the present invention.

Plate 321 is pivotally attached to motor 305 by hinge 329 which defines hinge axis 331 (i.e., plate 321 rotates about hinge axis 331). As can be seen from FIG. 7, hinge axis 331 is substantially perpendicular to axis 300 of shaft 208. Rotation of plate 321 about the hinge axis causes the end of the plate opposite the hinge to move in a direction which is substantially parallel to axis 300 (although the end of the plate does move slightly inward toward axis 300). As in the first preferred embodiment, the plate is thus movably mounted with respect to motions substantially parallel to axis 300, and fixedly mounted with respect to rotations about axis 300.

It will be clear to those skilled in the art that plate 321 need not be circular in shape. Plate 321 can, for example, be rectangular in shape.

When pin 327 of plate 321 is aligned with one of the holes in disk/hub 310, rotation of plate 321 about hinge 331 causes pin 327 to pass into the hole. With the plate and disk/hub thus engaged the shaft of motor 305 is unable to rotate. Weak spring 335 is provided to urge the plate toward the disk/hub.

When power is applied to motor 305, coil 250 pulls plate 321 towards the motor and thus disengages pin 327 from hole 313, thereby allowing shaft 308 to rotate freely.

When power is removed from motor 305 (and, in the case of circuit arrangements like those shown in FIGS. 10 and 11, after the dynamic braking current has decreased sufficiently), coil 250 no longer pulls plate 321 away from the disk/hub. This allows spring 335 to push plate 321 toward disk/hub 310. When rotary disk/hub 310 is rotating very slowly and the pin is aligned with one of the holes, the pin engages the hole and locks the motor. As described above, if the locking device is not engaged when the motor has stopped rotating, load forces or vibrations may cause the shaft of the motor to creep. In this case, the pin will engage a hole of the disk/hub at the first occurrence of registration.

In a preferred embodiment, the diameter of pin 327 is approximately 0.0625 inches, while the diameter of holes 313 are approximately 0.080 inches. The length of the pin is approximately 0.10 inches, and the thickness of the plate is approximately 0.080 inches. The thickness of the disk/hub is between about 0.020 inches and about 0.030 inches, and the diameter of the disk/hub is approximately 1.0 inches.

The embodiment of FIGS. 7–9 may be preferable to the embodiment of FIGS. 3–6 since it can be easier to implement. Again, the parts carrying the pin and holes can be reversed if desired.

Examples of the use of a positive locking device (e.g., as in FIGS. 3–9) with the solid state switching circuitry of FIGS. 2A–2D are shown in FIGS. 10A, 10B, 11A, and 11B.

Figure 10A:
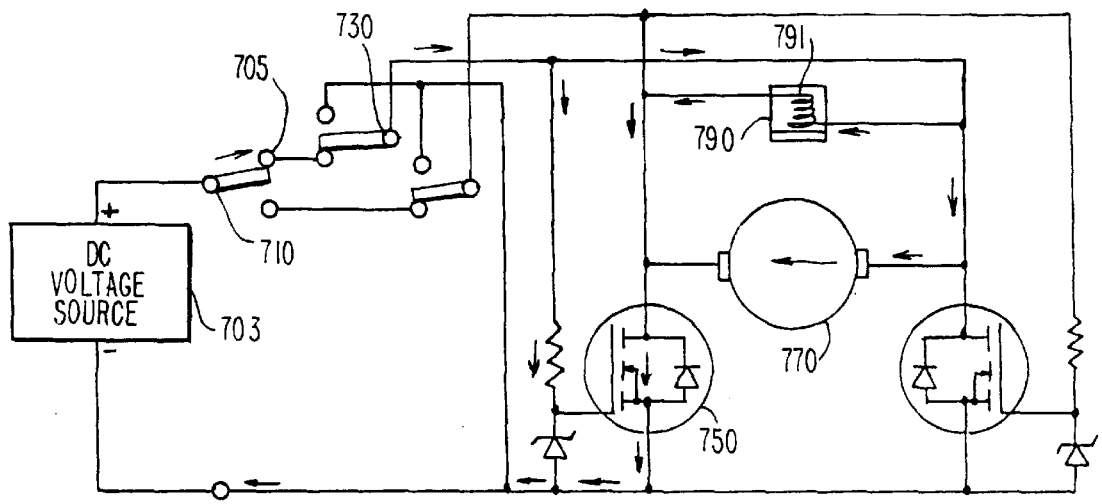
FIGS. 10A and 10B are schematic diagrams of circuitry for switching a PM motor and providing dynamic braking thereto, and also having a positive locking device electrically in parallel with the motor.
Figure 10B:
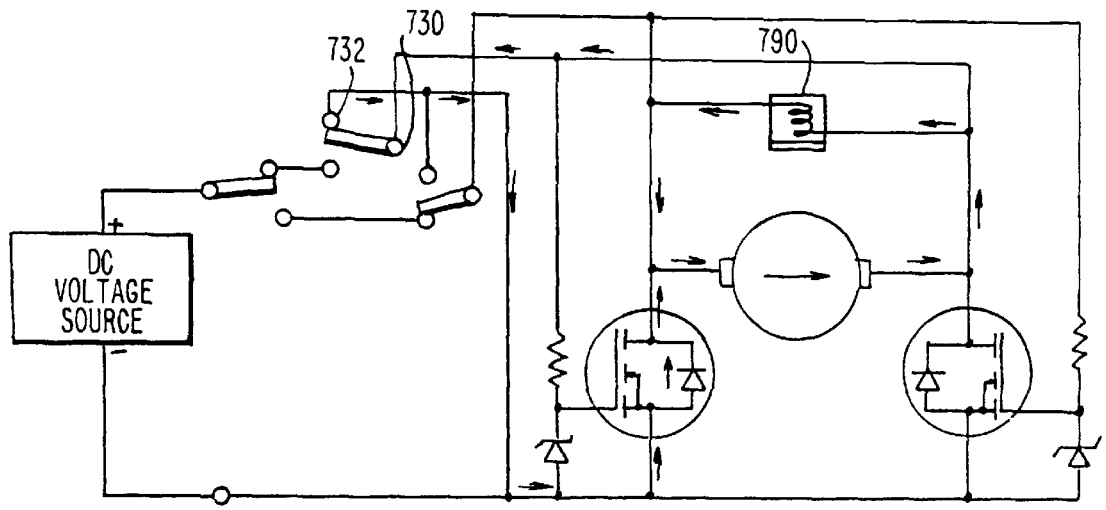

In FIGS. 10A and 10B, a positive locking device is shown in parallel with a PM motor. The switching circuitry of FIGS. 10A and 10B is substantially identical to that of FIGS. 2A–2D and has already been described in detail above. When switch 710 is in position 705, current from power source 703 passes through both of PM motor 770 and positive locking device 790 via transistor 750. With positive locking device 790 in parallel with the motor, a voltage which is applied to the motor is also applied to coil 791 of the positive locking device. This energizes coil 791 and allows the positive locking device to disengage the motor so that it can rotate freely.

When switch 730 is moved to position 732 as shown in FIG. 10B, power from voltage source 703 is removed from the motor and positive locking device. The back EMF generated by the motor causes a current to flow through coil 791 as indicated by the arrows. When the current flowing through positive locking device 790 becomes sufficiently small, the spring force is able to urge the plate toward the hub/disk so that the plate is able to engage the shaft of the motor.

Figure 11A:
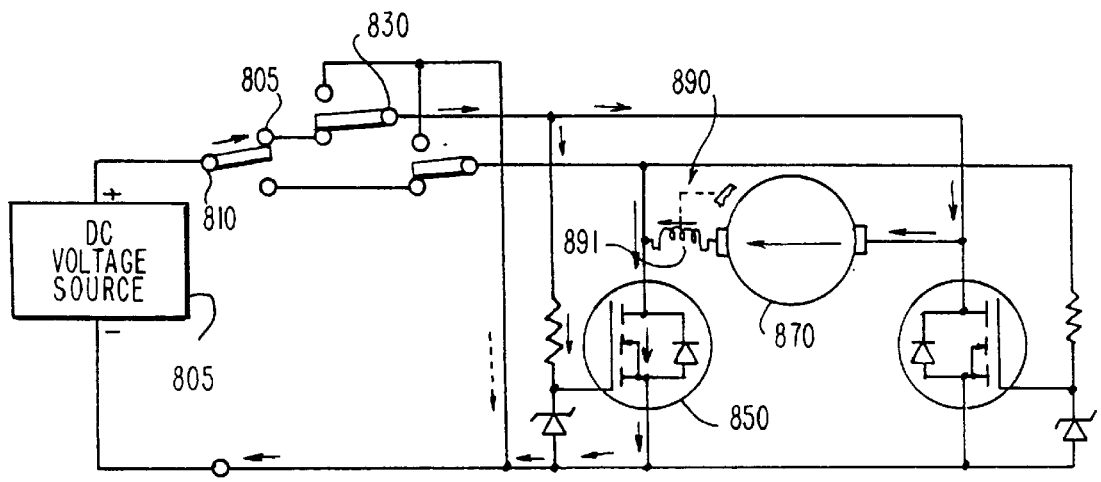
FIGS. 11A and 11B are schematic diagrams of the circuitry for switching a PM motor and providing dynamic braking thereto, and also having a positive locking device electrically in series with the motor.
Figure 11B:
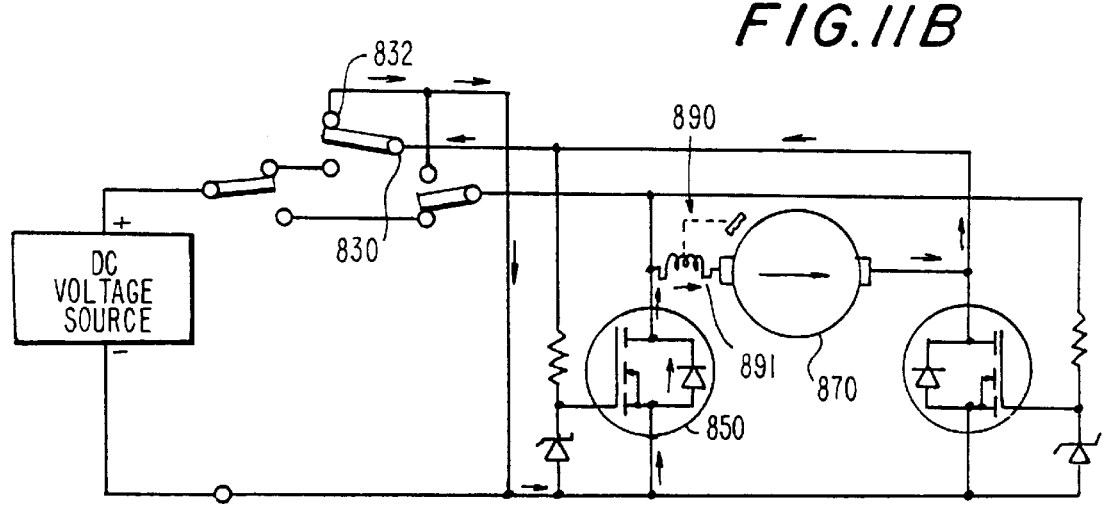

In FIGS. 11A and 11B, a positive locking device is shown in series with a PM motor. The switching circuitry of FIGS. 11A and 11B is substantially identical to that of FIGS. 2A–2D and has already been described in detail above. When switch 810 is in position 805, current from power source 803 passes through PM motor 870 and then through positive locking device 890 via transistor 850. With positive locking device 890 in series with the motor, a current passing through the motor also passes through coil 891. This allows the positive locking device to disengage the motor so that it can rotate freely.

When switch 830 is moved to position 832 as shown in FIG. 10B, power from voltage source 803 is removed from the motor and positive locking device. The back EMF generated by the motor causes a current to flow through coil 891 of the positive locking device as indicated by the arrows. When the current flowing through positive locking device 890 becomes sufficiently small, the plate will be urged toward the disk/hub so as to positively lock the motor.

Figure 12:
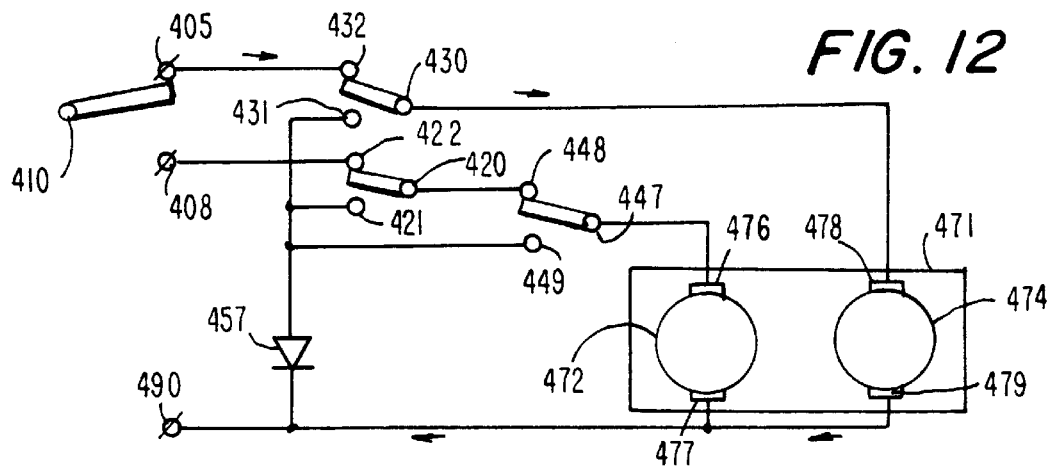
FIG. 12 is a schematic diagram of a dual armature PM motor constructed in accordance with the present invention.

In accordance with a third aspect of the present invention, a dual armature PM motor is schematically shown in FIG. 12. Dual armature PM motor 471 comprises a first armature winding 472 which communicates with first pair of armature brushes 476, 477, and a second armature winding 474 which communicates with second pair of armature brushes 478, 479. At least one permanent magnet (not shown) provides a magnetic field for the armature coils.

The direction of rotation of motor 471 is selected by connecting either the first or second set of armature brushes to the power supply. When switch 410 is at position 405, as shown in FIG. 12, current flows through switch 430, armature brush 478, armature 474, armature brush 479, and then to power return 490. This causes the motor to rotate in the forward direction. In order to shut off motor 471 when it is rotating in the forward direction, switch 430 (typically a limit switch) is moved from position 432 to position 431. The back EMF generated by armature 474 produces a current which flows through armature brush 478, diode 457, and then through armature brush 479. This current provides dynamic braking to the motor.

In order to cause motor 471 to rotate in the reverse direction, switch 410 is moved to position 408 (switch 430 is at position 432, and switch 420 is at position 422). This allows current to flow through switches 420 and 447, armature brush 476, armature 472, armature brush 477, and then to power return 490. The current passing through armature 472 causes motor 471 to rotate in the reverse direction.

In order to shut off motor 471 when it is rotating in the reverse direction, switch 420 (typically another limit switch) is moved from position 422 to position 421. The back EMF generated by armature 472 produces a current which flows through armature brush 476, diode 457, and then through armature brush 477. This current provides dynamic braking to the motor.

Switch 447 is provided in order to switch off the motor if a power overload occurs. If too much power is being required by the motor, switch 447 is moved from position 448 to position 449, thus cutting off power to the motor and providing dynamic braking. If desired, a similar overload protection switch can be provided for the other armature of the motor.

The armature coils 472, 474 preferably have approximately the same number of windings so that when an electrical current is provided to armature coil 472, the shaft of the motor rotates in a first direction with a first speed of rotation, and when the same amount of electric current is provided to armature coil 474, the shaft rotates in the opposite direction with a speed of rotation which is substantially equal to the first speed of rotation.

Figure 13:
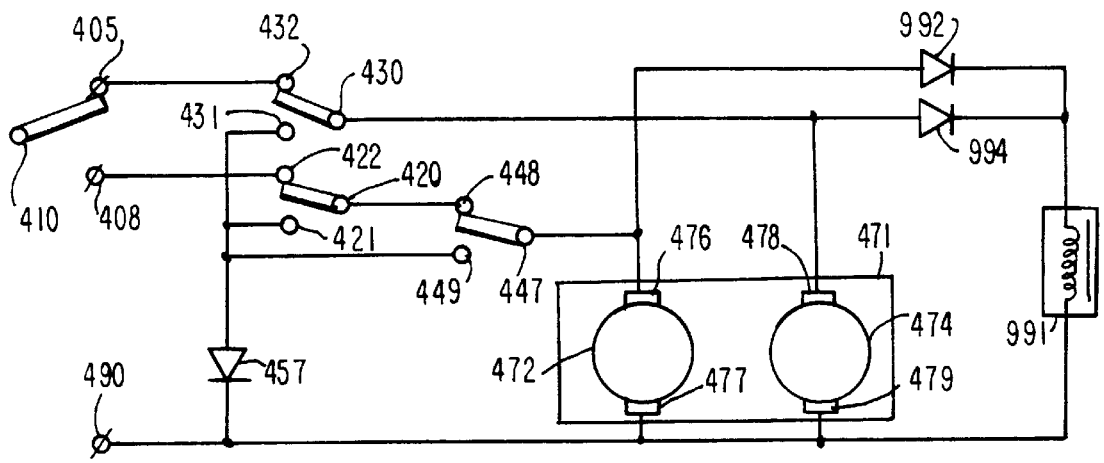
FIG. 13 is similar to FIG. 12, but shows a possible modification of the FIG. 12 apparatus in accordance with this invention.
Figure 14:
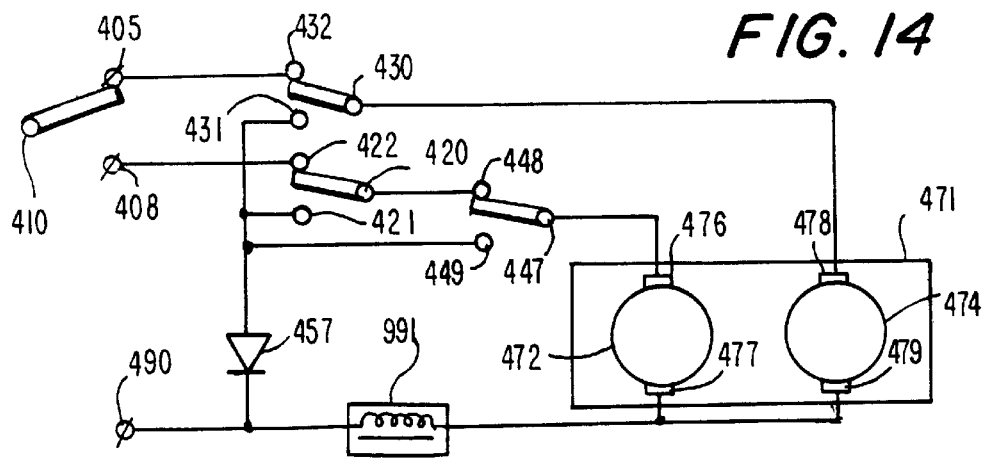
FIG. 14 is again similar to FIG. 12, but shows an alternative embodiment of the modification shown in FIG. 13.

FIG. 13 shows modification of the circuit of FIG. 12 to include the coil 991 of a positive locking device (similar to device 790 in FIGS. 10A and 10B) in parallel with armatures 472 and 474. Whenever current is applied to either of armatures 472 and 474, coil 991 is energized by current flowing through diode 992 or 994, thereby releasing the positive lock which otherwise prevents rotation of the motor. In the absence of current to armature 472 or 474, coil 991 is de-energized so that the associated positive locking device can engage and prevent armature rotation. FIG. 14 is similar to FIG. 13, but shows positive locking device coil 991 in series with armatures 472 and 474.

It will be understood that the foregoing is only illustrative of the principles of the present invention, and that various modifications can be made by those skilled in the art without departing from the spirit or scope of the invention. The described embodiments are presented for the purpose of illustration rather than limitation, and the present invention is limited only by the claims which follow.

What is claimed is:

1. A circuit for powering a permanent magnet electric motor to rotate in either of two directions and for dynamically braking the motor when powering of the motor ceases comprising:

a first input terminal for receiving electrical current from a current source for powering said motor to rotate in a first direction;

a second input terminal for receiving electrical current from said current source for powering said motor to rotate in a second direction;

a return terminal for returning current passed through said first or second input terminal and said motor to said current source;

a first switch for selectively making it possible for electrical current to flow from said first input terminal to a first connection of said motor, and for alternatively making it possible for electrical current to flow from said first connection to said return terminal;

a second switch for selectively making it possible for electrical current to flow from said second input terminal to a second connection of said motor, and for alternatively making it possible for electrical current to flow from said second connection to said return terminal;

a first transistor switch for selectively completing an electrical circuit between said first switch and said return terminal which passes through said motor between said first and second connections when said first switch is making it possible for electrical current to flow from said first input terminal to said first connection;

a second transistor switch for selectively completing an electrical circuit between said second switch and said return terminal which passes through said motor between said first and second connections when said second switch is making it possible for electrical current to flow from said second input terminal to said second connection;

a first circuit element for allowing current to flow from said return terminal to said first connection; and a second circuit element for allowing current to flow from said return terminal to said second connection.

2. The apparatus defined in claim 1 further comprising:
an electromagnetic mechanism for selectively locking said motor against rotation except when an electrical current is passing through a coil of said electromagnetic mechanism, said coil being connected in parallel between said first and second connections.

3. The apparatus defined in claim 1 further comprising:
an electromagnetic mechanism for selectively locking said motor against rotation except when an electrical current is passing through a coil of said electromagnetic mechanism, said coil being connected in series with said first and second connections.

4. The apparatus defined in claim 1 wherein each of said first and second switches is a limit switch.

5. Circuitry for switching a permanent magnet motor and providing dynamic braking thereto comprising:
a first transistor having a source, a drain, and a gate, said drain coupled to a first electrical input of said motor;
a second transistor having a source, a drain, and a gate, said drain of said second transistor coupled to a second electrical input of said motor, each of said source of said first transistor and said source of said second transistor coupled to a power return terminal;
a first power input terminal;
a first switch having a first and a second position, said first switch coupled to said first power input terminal, wherein:
while said first switch is in said first position, said first power input terminal is coupled to each of said gate of said first transistor and said second electrical input of said motor, so that while said first switch is in said first position and a voltage is applied to said first power input terminal, said first transistor allows current to flow through said motor and through said first transistor, in order to cause said motor to rotate in a first rotational direction; and
while said switch is in said second position, said first electrical input is coupled to said second electrical input, so that a first back electromotive force generated by said motor causes a first current to flow through said motor, in order to provide dynamic braking to said motor;
a second power input terminal;
a second switch having a first and a second position, wherein:
while said second switch is in said first position, said second power input terminal is coupled to each of said gate of said second transistor and said first electrical input of said motor, so that while said second switch is in said first position and said voltage is applied to said second power input terminal, said second transistor allows current to flow through said motor and through said second transistor, in order to cause said motor to rotate in a second rotational direction which is opposite said first rotational direction; and
while said switch is in said second position, said first electrical input is coupled to said second electrical input of said motor, so that a second back electromotive force generated by said motor causes a second current to flow through said motor, in order to provide dynamic braking to said motor.

6. The circuit of claim 5 wherein said gate of said first transistor is coupled to said power return via a Zener diode, and is coupled to said first switch via a resistor.

7. The circuit of claim 5, wherein while said first switch is in said second position said second terminal is coupled to said source of said first transistor.

8. The circuit of claim 7, wherein while said first switch is in said second position, said first current flows sequentially through said second terminal, said source of said first transistor, said drain of said first transistor, and then said first terminal.

9. The circuit of claim 7, wherein while said first switch is in said second position said second terminal is coupled to said source of said first transistor via a load resister.

10. The circuit of claim 5, wherein while said first switch is in said second position said first terminal is coupled to said second terminal via a diode.

11. The circuit of claim 10, wherein said diode is an internal diode of a MOSFET.

12. The circuit of claim 5, wherein said first transistor is a MOSFET.

13. The circuit of claim 5 wherein said gate of said second transistor is coupled to said power return via a Zener diode, and is coupled to said second switch via a resistor.

14. The circuit of claim 5, wherein while said second switch is in said second position said first terminal is coupled to said source of said second transistor.

15. The circuit of claim 14, wherein while said second switch is in said second position, said second current flows sequentially through said first terminal, said source of said second transistor, said drain of said second transistor, and then said second terminal.

16. The circuit of claim 14, wherein while said second switch is in said second position said first terminal is coupled to said source of said second transistor via a load resister.

17. The circuit of claim 5, wherein while said second switch is in said second position said second terminal is coupled to said first terminal via a diode.

18. The circuit of claim 17, wherein said diode is an internal diode of a MOSFET.

19. The circuit of claim 5, wherein said second transistor is a MOSFET.

20. The circuit of claim 5 further comprising a positive locking device having a coil which is electrically in series with said motor.

21. The circuit of claim 5 further comprising a positive locking device having a coil which is electrically in parallel with said motor.

22. Permanent magnet electric motor apparatus capable of rotating in either of two directions and being dynamically braked when power for rotating the motor ceases comprising:
a rotatable motor armature having first and second coils wound so that when power is applied to said first coil via an associated first set of brushes, said armature rotates in a first direction, and when power is applied to said second coil via an associated second set of brushes, said armature rotates in a second direction;
a first input terminal for receiving electrical current from a current source for powering said motor to rotate in a first direction;
a second input terminal for receiving electrical current from said current source for powering said motor to rotate in a second direction;
a return terminal for returning current passed through said first or second input terminal and said motor to said source;
a first switch for selectively completing a circuit between said first input terminal and said return terminal via said first set of brushes until said motor has rotated in said first direction by a predetermined amount, at which time said first switch completes a circuit between said first set of brushes; and a second switch for selectively completing a circuit between said second input terminal and said return terminal via said second set of brushes until said motor has rotated in said second direction by a predetermined amount, at which time said second switch completes a circuit between said second set of brushes.

23. The apparatus defined in claim 22 wherein each of said first and second switches is a limit switch.

24. A permanent magnet electric motor comprising:

a housing;

a shaft rotatably mounted to said housing;

a plurality of armature coils mounted on said shaft;

at least one permanent magnet mounted on said housing for providing a magnetic field in which said armature coils rotate;

a first plurality of armature brushes for providing an electric current to a first of said armature coils, in order to cause said shaft to rotate in a first direction; and a second plurality of armature brushes for providing said electric current to a second of said armature coils, in order to cause said shaft to rotate in a direction opposite said first direction.

25. The motor of claim 24 wherein providing said electric current to said first of said armature coils causes said shaft to rotate in said first direction with a first speed of rotation, and wherein providing said electric current to said second of said armature coils causes said shaft to rotate in said opposite direction with a speed of rotation which is substantially equal to said first speed of rotation.

* * * * *